(12) United States Patent
Manor

(10) Patent No.: US 7,753,794 B2
(45) Date of Patent: Jul. 13, 2010

(54) METHOD FOR VIEWING TELEVISED EVENTS

(76) Inventor: Zamir Manor, 11/18 Hapsanter Street, Rishon Le-Zion (IL) 75583

( * ) Notice: Subject to any disclaimer, the term of this patent is extended or adjusted under 35 U.S.C. 154(b) by 770 days.

(21) Appl. No.: 11/547,480

(22) PCT Filed: Mar. 28, 2005

(86) PCT No.: PCT/IL2005/000350

§ 371 (c)(1),
(2), (4) Date: Oct. 2, 2006

(87) PCT Pub. No.: WO2005/094171

PCT Pub. Date: Oct. 13, 2005

(65) Prior Publication Data

US 2007/0167233 A1    Jul. 19, 2007

(30) Foreign Application Priority Data

Mar. 31, 2004    (IL) ..................................... 161188

(51) Int. Cl.
*A63F 13/00* (2006.01)

(52) U.S. Cl. .............................. 463/42; 463/31; 463/40

(58) Field of Classification Search ............. 463/40–42, 463/31; 348/578; 370/527; 725/13
See application file for complete search history.

(56) References Cited

U.S. PATENT DOCUMENTS

| | | | |
|---|---|---|---|
| 5,917,553 A | * | 6/1999 | Honey et al. ................. 348/578 |
| 5,963,951 A | | 10/1999 | Collins |
| 6,049,333 A | | 4/2000 | LaJoie et al. |
| 6,052,122 A | | 4/2000 | Sutcliffe et al. |
| 6,058,367 A | | 5/2000 | Sutcliffe et al. |
| 6,061,681 A | | 5/2000 | Collins |
| 6,144,964 A | | 11/2000 | Breese et al. |
| 6,272,467 B1 | | 8/2001 | Durand et al. |
| 6,735,568 B1 | | 5/2004 | Buckwalter et al. |
| 2002/0080827 A1 | * | 6/2002 | Lee ............................ 370/527 |
| 2002/0116458 A1 | | 8/2002 | Bricklin et al. |

(Continued)

FOREIGN PATENT DOCUMENTS

WO    WO-00/62266 A1    10/2000

(Continued)

OTHER PUBLICATIONS

Badrul Sarwar et al., "Item-Based Collaborative Filtering Recommendation Algorithms", *WWW10*, pp. 285-295, May 1-5, 2001.

(Continued)

*Primary Examiner*—James S. McClellan
*Assistant Examiner*—Ankit Doshi
(74) *Attorney, Agent, or Firm*—Browdy and Neimark, PLLC

(57) ABSTRACT

A method for viewing a televised event, the televised event includes at least two competing parties in a playing area, each party being visually distinguished in respect of any other parties. Each party is associated with a distinctive region in the playing area of the televised event. The televised event includes a score indication with score portion for each party; the method including receiving a processed televised event for display on a display device. The score portions are associated with direction indications so as to facilitate visual association of each score indication portion to a respective party according to its distinctive region in the playing area.

4 Claims, 4 Drawing Sheets

U.S. PATENT DOCUMENTS

| | | | |
|---|---|---|---|
| 2002/0165919 A1 | 11/2002 | Pietila | |
| 2003/0011715 A1 | 1/2003 | Kastelic | |
| 2003/0019167 A1 | 1/2003 | Baume et al. | |
| 2004/0049779 A1* | 3/2004 | Sjoblom et al. | 725/13 |
| 2004/0162821 A1 | 8/2004 | Buckwalter et al. | |
| 2005/0159197 A1* | 7/2005 | Tawara | 463/4 |
| 2005/0164152 A1 | 7/2005 | Lawson | |

FOREIGN PATENT DOCUMENTS

| | | |
|---|---|---|
| WO | 2004015991 A2 | 2/2004 |
| WO | WO 2004/015991 A2 | 2/2004 |
| WO | WO 2005/022419 A1 | 3/2005 |

OTHER PUBLICATIONS

Benjamin R. Karney et al., "The Longitudinal Course of Marital Quality and Stability: A Review of Theory, Method, and Research", *Psychological Bulletin*, vol. 118, No. 1, pp. 3-34, 1995.

Thomas B. Holman et al, "Premarital Prediction of Marital Quality or Breakup—Research, Theory and Practice", Kluwer Academic/Plenum Publishers, 2001.

George Karypis, "Evaluation of Item-Based Top-N Recommendation Algorithms", University of Minnesota/Army HPC Research Center, Minneapolis, MN. Technical Report #00-046, pp. 1-13.

Marko Balabanovic et al., "Fab: Content-Based, Collaborative Recommendation", *Communications of the ACM*, vol. 40, No. 3, pp. 66-72, Mar. 1997.

Renate M. Houts et al., "Compatibility and the Development of Premarital Relationships", *Journal of Marriage and the Family*, vol. 58, pp. 7-20, Feb. 1996.

Sheizaf Rafaeli et al., "Social Recommender Systems: Recommendations in Support of E-Learning", *Journal of Distance Education Technologies*, vol. 3, No. 2, pp. 29-45, Apr.-Jun. 2005.

Miri Barak et al., "On-line question-posing and peer-assessment as means for web-based knowledge sharing in learning", *Int. J. of Human-Computer Studies*, vol. 61, pp. 84-103, 2004.

Paul Resnik et al., "Recommender Systems", *Communications of the ACM*, vol. 40, No. 3, pp. 56-58, Mar. 1997.

K. McKenna et al., "Plan 9 From Cyberspace: The implications of the Internet for Personality and Social Psychology", *Personality and Social Psychology Review*, vol. 4, No. 1, pp. 57-75, 2000.

G. Hitsch et al., "What Makes You Click: An Empirical Analysis of Online Dating", pp. 1-51, Jan. 2005.

Robert J. Brym et al., "Love Online: A Report on Digital Dating in Canada", msn.ca, Feb. 2001.

Dan Ariely et al., "Differential partitioning of extended experiences", *Organizational Behavior and Human Decision Processes*, vol. 91, pp. 128-139, 2003.

Nielsen // NetRatings, $21^{st}$ Century Dating: The Way It Is, pp. 1-4, Aug. 2, 2005.

Andrew T. Fiore et al., "Online Personals: An Overview", *CHI 2004*, Apr. 24-29, 2004.

Martin Lea et al., "Love at First Byte? Building Personal Relationships Over Computer Networks", Chapter 8, pp. 197-233, 2003.

Aaron Ahuvia et al., "Formal Intermediaries in the Marriage Market: A Typology and Review", *Journal of Marriage and the Family*, vol. 54, pp. 452-463, May 1992.

J. B. Walther, Computer Mediated Communication: Impersonal, Interpersonal, and Hyperpersonal Interaction, *Communication Research*, vol. 23, No. 1, pp. 3-43, Feb. 1996.

K. McKenna et al., "Relationship Formation on the Internet: What's the Big Attraction?", *Journal of Social Issues*, vol. 58, No. 1, pp. 9-31, 2002.

Alvin Cooper et al., "Romance in Cyberspace: Understanding Online Attraction", *Journal of Sex Education and Therapy*, vol. 22, No. 1, pp. 7-14, 1997.

Clio Cresswell, "Mathematics and Sex", Published by Griffin Press, 2003.

John M. Gottman et al., "The Mathematics of Marriage Dynamic Nonlinear Models", A Bradford Book, MIT Press, London, England, 2002.

Thomas B. Holman et al., "Premarital Prediction of Marital Quality or Breakup—Research, Theory and Practice", Kluwer Academic/Plenum Publishers, 2001.

Harvey, Ickes & Kidd, "Compatible and Incompatible Relationships", Springer Series in Psychology, Edited by William Ickes, SSSP, (See Part II Section 4, Part IV Section 8 and 10, Part V Section 13), 1985.

John Riedl et al., "Word of Mouse—The Marketing Power of Collaborative Filtering", Warner Books, Inc. 2002.

\* cited by examiner

METHOD FOR VIEWING TELEVISED EVENTS

FIELD OF THE INVENTION

The present invention is in the general field of viewing sporting events such as football, soccer, baseball, basketball and other games.

BACKGROUND OF THE INVENTION

Viewing sporting events on television has become very popular, as the average spectator can view a game or competition in the comfort of her home, and due to modem technology, can also benefit from high quality sound and images. Thus, due to today's modem equipment, e.g., high resolution large screen TVs equipped with a surround audio system, the excitement and sensation of a sports competition can be brought into the viewer's home, as if she actually attended the event as a spectator.

Needless to say, viewing at home obviates the long trip to the stadium, as well as waiting in line to purchase tickets, and obviously the inconvenience of having to withstand prevailing temperatures when an event takes place during cold or hot weather conditions.

Bearing all this in mind, and considering also the popularity of some of the sports such as soccer, it is no surprise that the common estimate is that nearly two billion people viewed the televised Mondial 2002 Tournament that took place in Japan and South Korea.

Modem TV technology, in particular digital TV broadcasting, enables not only to view in high quality a particular sporting event, but also to apply numerous functions to the so-viewed events such as replays, freezing a frame of interest and providing instantaneous statistics on the screen that relate to an ongoing action using, e.g., interactive commands activated by means of the television remote control. With the introduction of improved technologies, both at the broadcasting end as well as in the television receiving unit, more and more options are constantly being introduced to further enhance the viewer's enjoyment from the viewed sporting event.

The wide range of options discussed above, still do not cope with a typical scenario which, in many cases, causes frustration to the common viewer. Consider for example (with reference to FIG. 1), a soccer match is being shown on the viewer's TV screen (10), which has started at say, 19:00, and the viewer turns on her television set and 19:10, and notices from the score indication (11) that the score is one-nil in team B's favor. This obviously means that team B managed to score a goal during the first ten minutes of the game missed by the viewer.

Assuming also that the viewer cannot identify from the football players' uniforms which is team B, i.e., in the example of FIG. 1, it is not clear whether the team with the uniform consisting of black shorts and striped shirts (12) is the leading team (i.e. the team defending the left side of the football court (12') and attacking to the right side of the football court (13')), or whether the team with the uniform consisting of white shorts and checkered shirts (13) is the leading team (i.e. the team defending the right side of the football court (13') and attacking to the left side of the football court (12')). This, obviously, causes a lot of frustration to the viewer who is naturally interested in knowing who the leading team is. In some cases, it may take several minutes, or even longer, until the viewer actually becomes aware of the scores of each respective team. For example, the viewer may only become aware of the score of the game after the commentator provides information as to which side is the leading side, or, for another example, when one of the teams scores another goal, and in response, the score indication (11) is updated on the screen, enabling the viewer to see the latest score and become aware of which team was leading until the latest goal. Whereas the example of FIG. 1 refers to a scenario where one team leads, the need to identify the participating teams obviously arises also in the case of draw, say 0:0, since the viewer naturally wants to identify which team is team A and which team is team B.

In other sports, such as basketball, the score is updated more frequently. However, still, the common viewer would like to know on the spot upon turning on her TV receiver, who is currently winning. It is true that in many cases the viewer is familiar with the uniforms of both teams (e.g., when her favorite team is participating) or the players themselves, and therefore can identify on the spot, without any additional assistance, who is the leading team, (e.g., in the case of FIG. 1, she is well familiar with the uniform of Team B/A and/or with the players), and as she turns on the TV, she will know who is leading. However, in many cases this is not true. For example, even for her favorite team, it may well be the case, that for a particular match, uniforms were changed, or, for example, the viewer is watching a soccer game between two teams with whom the viewer is familiar, however, not to the extent that she can readily identify the team by their uniform.

PCT WO 2004/015991 provides for a method for viewing a televised event. The televised event includes a few competing parties wherein each party has a uniform that is visually distinguished in respect of the uniform of any other party of the other parties. The televised event includes a score indication with score portion for each party. The method includes receiving a processed televised event for display on a display device. The score indication portions are colored so as to facilitate visual association of each score indication portion to a respective party according to the color of the uniform of the party.

There is accordingly a need in the art to facilitating new immediate means of identifying which from among the two teams is the losing one and the winning one.

SUMMARY OF THE INVENTION

In the context of the invention, the term televised sporting event should be construed in a broad sense, encompassing viewing sporting events via a television screen, computer monitor, being non-limiting examples of a displaying device. The invention encompasses viewing broadcast sporting events and/or time-shifted sporting events. For convenience, the description refers to the specific example of a soccer game with two competing teams. Those versed in the art will readily appreciate that the invention is by no means bound to this particular example, and accordingly, any other sport event, including, but not limited to American Football, Rugby, Baseball, Basketball, Volleyball is applicable. The playing area in the particular example of football being the football court and the distinctive region would be the region allocated to each team (for instance the football court side which the party defends or the football court side which the party attack). In the particular example of FIG. 1, the distinctive region in the playing area (by this specific example football court) of team 12 can be the left side 12' of the court (in the case that the distinctive region is the defended region) or the right side 13' (in the case that the distinctive region is the defended region). Normally, although not obligatory, the ditinctive region associated with a party (say football team) would be the region in the playing area which is attacked by the party. The invention is, of course, not bound by this specific example of playing area and distinctive region. It should be noted that the viewer can identify the "substance" of the distinctive region (e.g. defended area of attacked area) in various manners. For instance, a certain TV channel may employ a convention, where always the distinctive region is the "attacked area". Accordingly users of this channel will always identify a direction indication (say a left arrow) associated with the score portion, as identifying the distinctive are towards which the party under consideration attacks.

Likewise, the invention is not bound to only sporting events having two competing parties, but any number of competing parties, all depending on the sport events. Still further, whereas the specific examples focus on competing teams, this is only one example of competing parties. Thus, by another example each competing party is a single participant.

Those versed in the art will further appreciate that the proposed invention may likewise be applicable to other competitions or games, not necessarily confined to sport (e.g., televised quiz shows with several participating teams, each identified by a respective uniform).

Score (indication) portion is the portion of the score indication that is associated with a given party. For illustrative purposes only, in the case of FIG. 1, the score portion of Team A is "Team A 0" and the score portion of Team B is "Team B 1".

Direction indication should be construed in a broad manner. Thus, by way of example, it is a symbol or symbols following or preceding letters and or numbers of the score portion. By way of another example the symbol is incorporated (e.g. as a background) in the score portion. As will be exemplified in greater detail below, a non limiting example of a symbol is an arrow. Other examples are applicable all depending upon the particular application.

By a first of its aspects the invention provides a method for viewing a televised event, the televised event includes at least two competing parties in a playing area, each party being visually distinguished in respect of any other party of said at least two parties, and wherein each party is associated with a distinctive region in the playing area of the televised event; the televised event includes a score indication with score portion for each party; the method comprising:

receiving a processed televised event for display on a display device; the score portions are associated with direction indications so as to facilitate visual association of each score indication portion to a respective party according to its distinctive region in the playing area.

The invention further concerns a method for viewing a televised event, the televised event includes at least two competing parties in a playing area, each party being visually distinguished in respect of any other party of said at least two parties, and wherein each party is associated with a distinctive region in the playing area of the televised event; the televised event includes a score indication with score portion for each party; the method comprising:

processing the televised event for display on a display device; the processing include: associating direction indications to the score portions so as to facilitate visual association of each score indication portion to a respective party according to its distinctive region in the playing area.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
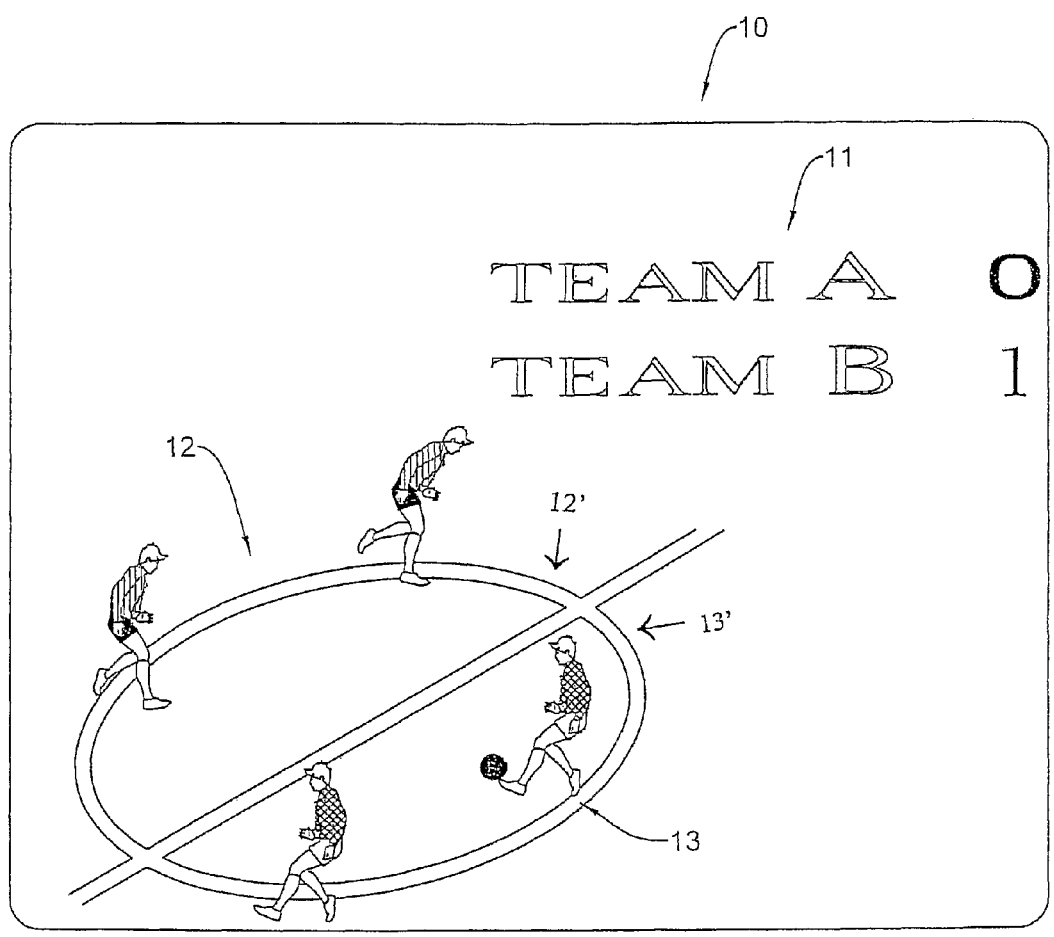
FIG. 1 illustrates schematically a still frame taken from a televised broadcast of a soccer game between Team A and Team B, according to the prior art.
Figure 2:
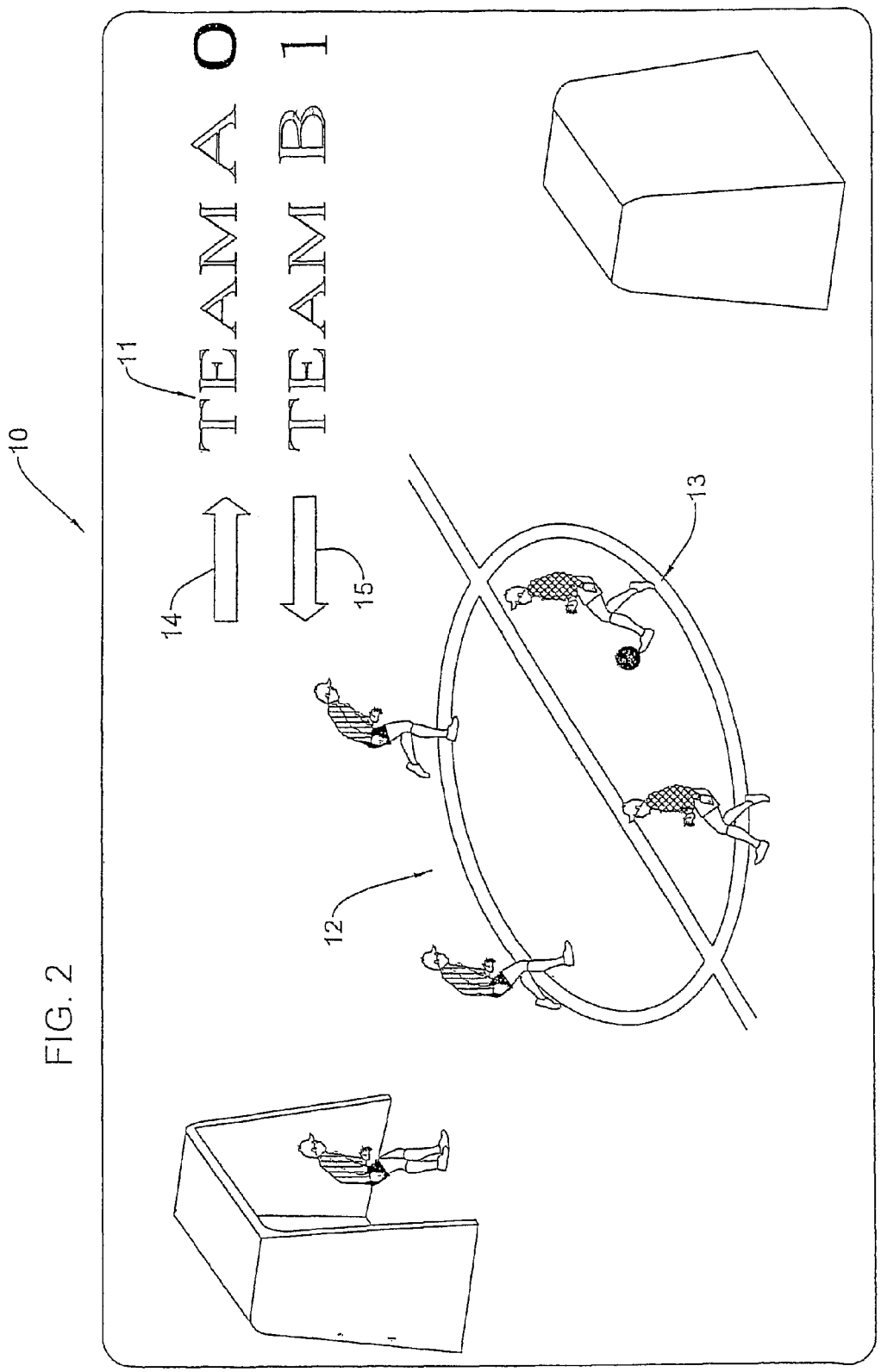
FIG. 2 illustrates schematically a still frame taken from a televised broadcast of a soccer game between Team A and Team B, according to an embodiment of the invention.

Attention is now drawn to FIG. 2 illustrating, schematically, a still frame taken from a televised broadcast of a soccer game between Team A and Team B, according to an embodiment of the invention. The still frame and the score indication of FIG. 2 are basically identical to that illustrated in FIG. 1 and therefore they have been designated the same reference numerals.

Figure 3:
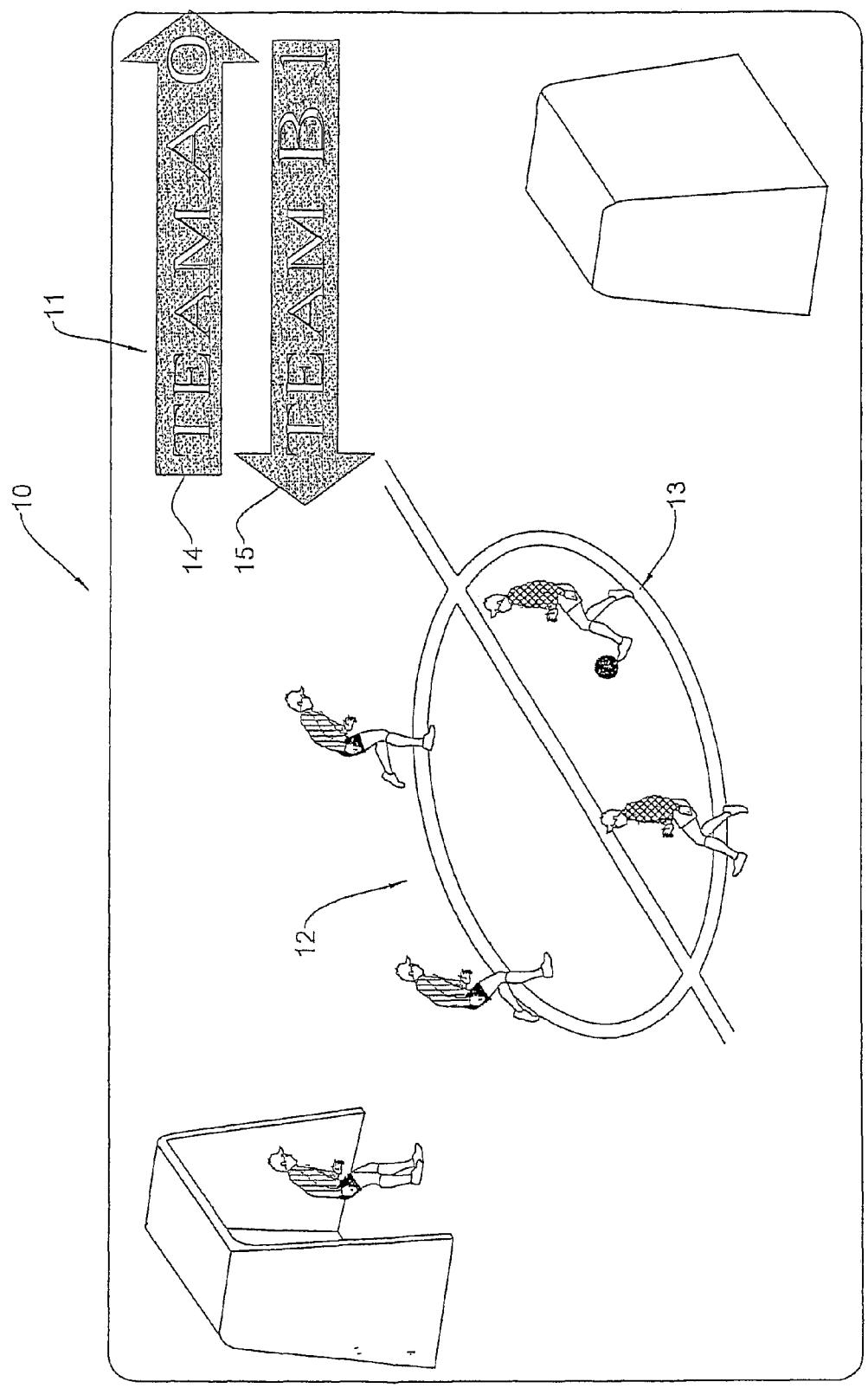
FIG. 3 illustrates a direction indication according to another embodiment of the invention.

In accordance with this embodiment of the invention, the playing area is a football court and the two parties (by this particular example team A and team B) have each a distinctive region. Team A is attacking to the right (i.e. its' distinctive region is the right side of the court) and team B is attacking to the left (i.e. its distinctive region is the left side of the court). By this specific embodiment, the direction indication is an arrow symbol that precedes the score indication portion. More specifically, the right arrow symbol 14 that precedes the score portion "Team A" indicates that team A attacks to the right and the two players (with black shorts) are part of Team A. Likewise, the left arrow symbol 15 that precedes the score portion "Team B" indicates that team B attacks to the left and the two players (with white shorts) are part of Team B. Thus, an immediate visual association between the score indication portion and the teams is brought about. The invention is by no means bound by the form, size or place of the arrow symbol. Thus, by way of another example, the arrow may follow (instead of precede) the score indication portion and/or may be of different form. Another non limiting example of an arrow symbol is illustrated in FIG. 3, where, as shown, the background of the score portion is depicted in the form of an arrow 14 (for the right arrow) and 15 (for the left arrow). Note that the invention is not bound by using an arrow as direction indication. Note also that the direction indication may include more than one symbol. By way of another non limiting example, the direction indication is a direction word, say "left" or "right" (which the case may be) preceding or following the score portion.

Figure 4:
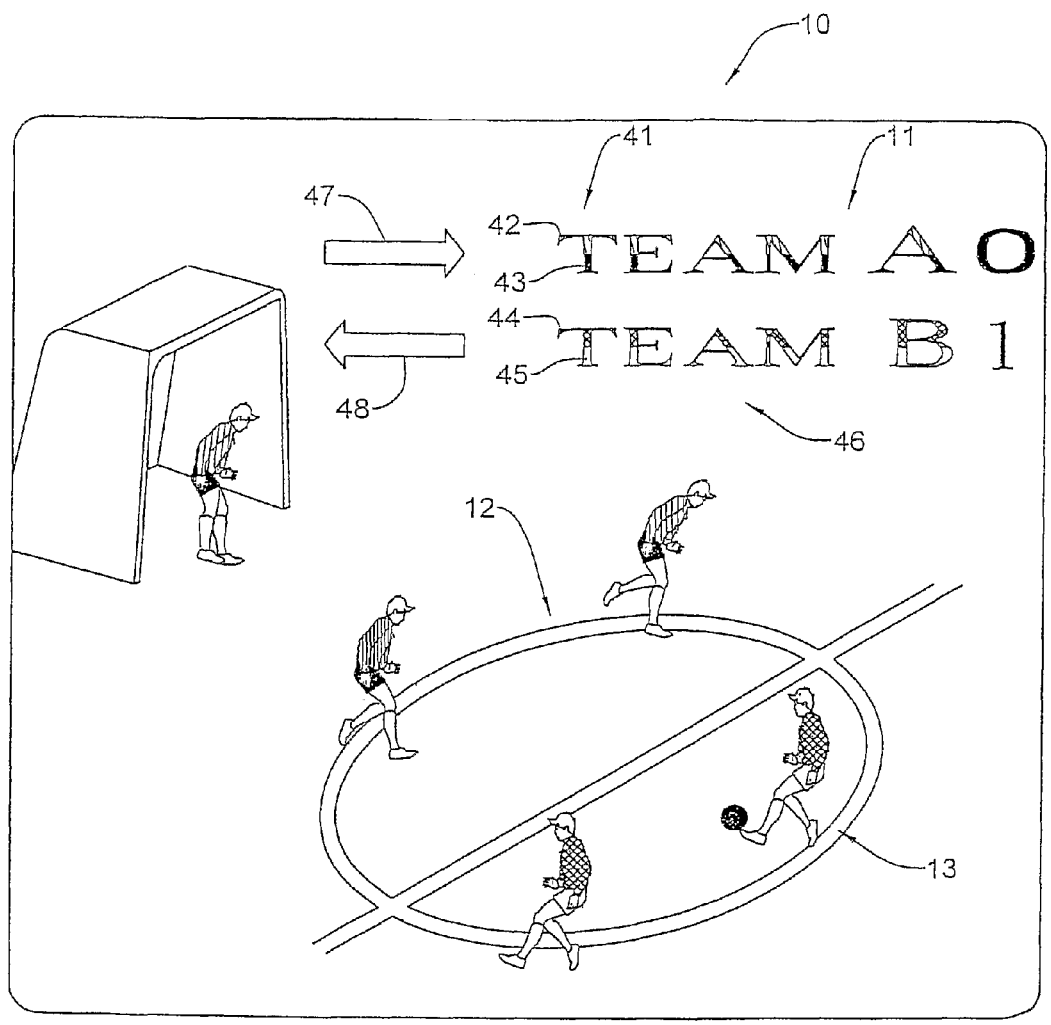
FIG. 4 illustrates schematically a still frame taken from a televised broadcast of a soccer game between Team A and Team B, according to an embodiment of the invention.

Turning now to FIG. 4, the direction indication may be used in conjunction with the technique disclosed in PCT WO 2004/015991 whose content is incorporated herein by reference. As shown in FIG. 4, the score indication fonts of each party (e.g. team) has a color that uniquely identifies the uniform of its respective party. Thus, in the example of FIG. 4, the letters (being an example of a score indication portion) of TEAM A has a color identical to that of the uniform of TEAM A. For example, the upper portion of the letter T (41) of TEAM is striped (42) and the lower portion thereof is black (43), being in this case of the same color and pattern as that of the respective shirts and shorts of the uniform of the players (12) of TEAM A.

As shown in FIG. 4, the same applies to the score components of the score indication portion of TEAM B, see e.g., the upper portion of the letter T of TEAM is checkered (44) and the lower portion thereof is white (45), being in this case, of the same color and pattern as that of the respective shirts and shorts of the uniform of the players (13) of TEAM B.

In addition, a right arrow symbol 47 (being an example of a direction indication) precedes the score indication portion of Team A (facilitating immediate visual association of Team A with the right side of the court, towards which Team A attacks), and, likewise, a left arrow symbol 48 (being an example of a direction indication) precedes the score indication portion of Team B (facilitating immediate visual association of Team B with the left side of the court, towards which Team B attacks).

Using the proposed technique of the invention as illustrated in the examples above, will facilitate the viewer to readily associate the score to the respective playing parties (in this case the playing teams) and to thus be updated as to the current state of the game and more specifically, as to who is the leading/losing side.

The various alternative embodiments described above are only few out of many possible variants for using colored score indication in order to facilitate immediate identification of the participating parties. Note that other desired assisting means may be utilized, e.g. portraying the club symbol near its respective name. Thus, for example, the letter T (42) may be preceded by the club symbol of TEAM A and, likewise, the letter T (44) may be preceded by the club symbol of TEAM B.

Figure 5:
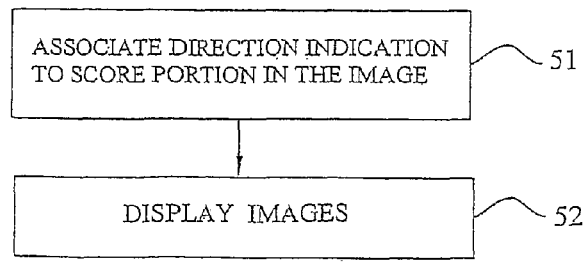
FIG. 5 illustrates a generalized block diagram of the operational steps for implementing the viewing method of the invention.

Attention is now drawn to FIG. 5, illustrating a generalized block diagram of the operational steps for implementing the viewing method of the invention in accordance with an embodiment of the invention. Thus, the images, e.g. a succession of video frames are processed (51) to apply direction indication all as explained in detail above, with reference to FIGS. 2 to 4. There are numerous known per se techniques to apply color in the manner specified. The so-processed images are then displayed (52) on the screen of the displaying device, e.g. TV, computer screen, etc. Note that FIG. 5 illustrates the process in a generalized manner and known per se steps are not illustrated herein. For example, the processing may take place at a broadcasting station and the processed images are then broadcast, received by the display device processed therein and displayed on its screen. Other variants are applicable, all depending on the particular application.

The present invention has been described with a certain degree of particularity, but those versed in the art will readily appreciate that various alterations and modifications may be carried out without departing from the scope of the following Claims:

The invention claimed is:

1. A method for displaying a broadcast televised sporting event, the televised sporting event includes two competing teams in a playing area, each team being visually distinguished in respect to the other team, and wherein each team is associated with a distinctive offensive region in the playing area of the televised sporting event and wherein players of each team attempt to drive a ball in a direction of their respective distinctive offensive region; the televised sporting event includes a score indication with a score portion indicating a score for each team; the method comprising:

receiving a processed broadcast televised sporting event for display on an electronic display device;

associating the score portion of each team with an arrow symbol direction indicator;

determining the direction of the distinctive offensive region of each team; and displaying the arrow symbol direction indicator for each team in the direction of their respective offensive region, wherein each team's arrow symbol direction indicator is displayed in their respective score portion on the electronic display device.

2. The method according to claim 1, wherein said sporting event being anyone of soccer, American football, basketball, Rugby and volleyball.

3. A method for preparing for displaying a broadcast televised sporting event, the televised sporting event includes two competing teams in a playing area, each team being visually distinguished in respect to the other team, and wherein each team is associated with a distinctive offensive region in the playing area of the televised sporting event and wherein players of each team attempt to drive a ball in a direction of their respective distinctive offensive region; the televised sporting event includes a score indication with a score portion indicating a score for each team; the method comprising:

processing the broadcast televised sporting event for display on an electronic display device, the processing including:

associating the score portion of each team with an arrow symbol direction indicator;

determining the direction of the distinctive offensive region of each team; and displaying the arrow symbol direction indicator for each team in the direction of their respective offensive region, wherein each team's arrow symbol direction indicator is displayed in their respective score portion on the electronic display device.

4. The method according to claim 3, wherein said sporting event being anyone of soccer, American football, basketball, Rugby and volleyball.

\* \* \* \* \*